US012749234B2

(12) United States Patent
Yu et al.

(10) Patent No.: US 12,749,234 B2
(45) Date of Patent: Sep. 29, 2026

(54) SYSTEM AND METHOD FOR EFFICIENT TEXT-GUIDED GENERATION OF HIGH-RESOLUTION VIDEOS

(71) Applicant: NVIDIA Corporation, Santa Clara, CA (US)

(72) Inventors: Sihyun Yu, Gyeonggi-do (KR); Weili Nie, Sunnyvale, CA (US); De-An Huang, Cupertino, CA (US); Boyi Li, Berkeley, CA (US); Animashree Anandkumar, Pasadena, CA (US)

(73) Assignee: NVIDIA Corporation, Santa Clara, CA (US)

( * ) Notice: Subject to any disclaimer, the term of this patent is extended or adjusted under 35 U.S.C. 154(b) by 105 days.

(21) Appl. No.: 18/819,064

(22) Filed: Aug. 29, 2024

(65) Prior Publication Data

US 2025/0111552 A1 Apr. 3, 2025

Related U.S. Application Data

(60) Provisional application No. 63/586,915, filed on Sep. 29, 2023, provisional application No. 63/586,336, filed on Sep. 28, 2023.

(51) Int. Cl.
*G06T 3/4046* (2024.01)
*G06N 3/0455* (2023.01)
(Continued)

(52) U.S. Cl.
CPC ............ *G06T 11/00* (2013.01); *G06N 3/0455* (2023.01); *G06T 9/002* (2013.01)

(58) Field of Classification Search
CPC ........ G06T 11/00; G06T 9/002; G06N 3/0455
See application file for complete search history.

(56) References Cited

U.S. PATENT DOCUMENTS 11,868,887 B2 * 1/2024 Kandemir ................ G06N 3/09
11,908,118 B2 * 2/2024 Xu .......................... G06T 7/246
(Continued)

FOREIGN PATENT DOCUMENTS

CN 117544833 A * 2/2024 ........... H04N 21/854
CN 117880446 A * 4/2024 ....... H04N 21/44016
(Continued)

OTHER PUBLICATIONS

Yu, Efficient Video Diffusion Models via Content-Frame Motion-Latent Decomposition, 2024, ICLR, pp. 1-29. (Year: 2024).*
(Continued)

*Primary Examiner* — Cheng Yuan Tseng
(74) *Attorney, Agent, or Firm* — Leydig, Voit & Mayer, Ltd.

(57) ABSTRACT

Systems and methods are disclosed that train a content frame-motion latent diffusion model (CDM) and use the CDM to generate requested videos. The CMD may be a two-stage framework that first compresses videos to a succinct latent space and then learns the video distribution in this latent space. For instance, the CMD may include an autoencoder and two diffusion models. In a first stage, using the autoencoder, a low-dimensional latent decomposition into a content frame and latent motion representation is learned. In the second stage, without adding any new parameters, the content frame distribution may be fine-tuned by using a pretrained image diffusion model, which allows the CMD to leverage the rich visual knowledge in pretrained image diffusion models. In addition, a new lightweight diffusion model may be used to generate motion latent representations that are conditioned on the given content frame.

22 Claims, 11 Drawing Sheets

(51) Int. Cl.
*G06T 9/00* (2006.01)
*G06T 11/00* (2006.01)

(56) References Cited

U.S. PATENT DOCUMENTS

| | | | | |
|---|---|---|---|---|
| 12,056,807 | B2 * | 8/2024 | Cappello | G06T 15/06 |
| 12,412,319 | B2 * | 9/2025 | Wang | G06T 11/00 |
| 12,412,340 | B2 * | 9/2025 | Kreis | G06T 17/20 |
| 12,499,515 | B2 * | 12/2025 | Crabtree | G06T 5/60 |
| 2024/0169479 | A1 * | 5/2024 | Wang | G06T 3/4053 |
| 2024/0281924 | A1 * | 8/2024 | Park | G06T 3/4046 |
| 2024/0304010 | A1 * | 9/2024 | Gothe | G06T 7/20 |
| 2024/0321318 | A1 * | 9/2024 | Vachhani | G06V 20/44 |
| 2024/0355017 | A1 * | 10/2024 | Elyahu Zada | G06T 3/4053 |
| 2024/0386529 | A1 * | 11/2024 | Yang | G06N 3/045 |
| 2025/0111552 | A1 * | 4/2025 | Yu | G06N 3/088 |
| 2025/0111866 | A1 * | 4/2025 | Ceylan Aksit | G11B 27/031 |
| 2025/0182404 | A1 * | 6/2025 | Kreis | G06T 17/00 |
| 2025/0252641 | A1 * | 8/2025 | Wu | G06T 13/40 |
| 2025/0265752 | A1 * | 8/2025 | Sree Harsha | G06T 5/70 |
| 2025/0342568 | A1 * | 11/2025 | Li | G06T 5/77 |
| 2025/0356570 | A1 * | 11/2025 | Wu | G06F 40/205 |
| 2025/0378619 | A1 * | 12/2025 | Wang | G06T 15/04 |
| 2026/0004495 | A1 * | 1/2026 | Wang | G06T 13/205 |

FOREIGN PATENT DOCUMENTS

| | | | | | |
|---|---|---|---|---|---|
| CN | 118138856 | A | * | 6/2024 | G06N 3/08 |
| CN | 118714417 | A | * | 9/2024 | G06N 3/0455 |
| CN | 118840763 | A | * | 10/2024 | G06N 3/088 |
| CN | 120111318 | A | * | 6/2025 | G06V 20/46 |
| WO | WO-2023147262 | A1 | * | 8/2023 | H04N 19/139 |
| WO | WO-2024228676 | A1 | * | 11/2024 | G06N 3/08 |
| WO | WO-2024249060 | A1 | * | 12/2024 | G06N 3/096 |
| WO | WO-2025154887 | A1 | * | 7/2025 | G06N 3/09 |

OTHER PUBLICATIONS

Ho, Video Diffusion Models, 2022, 36th Conference on Neural Information Processing Systems, 2022, pp. 1-14. (Year: 2022).*

Blattmann, A., et al., "Align your latents: High-resolution video synthesis with latent diffusion models," In IEEE Conference on Computer Vision and Pattern Recognition, 2023.

He, Y., et al., "Latent video diffusion models for high-fidelity video generation," arXiv preprint arXiv:2211.13221, 2023.

Ho, J., et al., "Imagen video: High definition video generation with diffusion models," arXiv preprint arXiv:2210.02303, 2022.

Ho, J., et al., "Video diffusion models," arXiv preprint arXiv:2204.03458, 2022.

Hong, W., et al., "CogVideo: Large-scale pretraining for text-to-video generation via transformers," In International Conference on Learning Representations, 2023.

Singer, U., et al., "Make-a-video: Text-to-video generation without text-video data," In International Conference on Learning Representations, 2023.

Villegas, R., et al., "Phenaki: Variable length video generation from open domain textual descriptions," In International Conference on Learning Representations, 2023.

Wang, W., et al., "Swap attention in spatiotemporal diffusions for text-to-video generation," arXiv preprint arXiv:2305.10874, 2023.

Wu, C., et al., "NUWA: Visual synthesis pre-training for neural visual world creation," In European Conference on Computer Vision, 2022.

Yan, W., et al., "VideoGPT: Video generation using VQ-VAE and transformers," arXiv preprint arXiv:2104.10157, 2021.

Yu, L., et al., "MAGVIT: Masked generative video transformer," In Proceedings of the IEEE/CVF Conference on Computer Vision and Pattern Recognition, pp. 10459-10469, 2023.

Yu, S., et al., "Video probabilistic diffusion models in projected latent space," In IEEE Conference on Computer Vision and Pattern Recognition, 2023.

* cited by examiner

SYSTEM AND METHOD FOR EFFICIENT TEXT-GUIDED GENERATION OF HIGH-RESOLUTION VIDEOS

CLAIM OF PRIORITY

This application claims the benefit of U.S. Provisional Application No. 63/586,336 titled "SYSTEM AND METHOD FOR EFFICIENT TEXT-GUIDED GENERATION OF HIGH-RESOLUTION VIDEOS," filed Sep. 28, 2023 and U.S. Provisional Application No. 63/586,915 titled "SYSTEM AND METHOD FOR EFFICIENT TEXT-GUIDED GENERATION OF HIGH-RESOLUTION VIDEOS," filed Sep. 29, 2023, the entire contents of which are incorporated herein by reference.

BACKGROUND

Recently, deep generative models have shown remarkable success in synthesizing photorealistic and high-resolution images using diffusion models (DMs), and even achieving promising results in difficult text-to-image (T2I) generation. Inspired by the success in the image domain, recent approaches have focused on solving a considerably more challenging task of video generation. However, unlike the image domain, there is still a considerable gap in video quality between generated and real-world videos. This is mainly due to the difficulty of collecting a large training dataset of high-quality videos and the high dimensionality of video data as cubic arrays, which leads to a heavy memory and computational burden.

To tackle the data collection issue, several conventional video DM approaches leverage pretrained image DMs for video generation. This may lead to better generation quality and faster training convergence when compared to training a video DM from scratch. However, since these video models directly generate high-dimensional videos as cubic arrays, they still entail high memory consumption and computational costs, especially for high-resolution and long videos. Another line of conventional video DM approaches focuses on alleviating memory and computational inefficiency by first projecting the video into a low-dimensional latent space and then training a DM in the latent space. However, such latent video DMs are only trained on a limited amount of video data and do not incorporate pre-trained image models, which limits their video generation quality. Thus, there is a need to improve the conventional techniques discussed above.

SUMMARY

Embodiments of the present disclosure relate to one or more efficient latent video diffusion models (DMs) that improve text-guided generation of high-resolution videos. For instance, video DMs have recently made progress in generation quality, but conventional video DMs may still be limited by the high memory and computational requirements. This is because conventional video DMs often attempt to directly process the high dimensional videos. In contrast to conventional approaches, embodiments of the present disclosure describe a content-motion latent diffusion model (CMD), which may be an efficient extension of pretrained image diffusion models that are used for video generation. For example, embodiments of the present disclosure may include an autoencoder that succinctly encodes a video as an "image-like" content frame and a low-dimensional motion latent representation, which represent the common content and underlying motion in a video, respectively. For instance, embodiments of the present disclosure may generate the content frame by fine-tuning a pretrained image diffusion model, and may generate the motion latent representation by training a new lightweight DM. As such, embodiments of the present disclosure may design a compact latent space that may directly utilize a pretrained image model, which has not been utilized by conventional latent video DMs. Thus, by utilizing embodiments of the present disclosure, this may lead to considerably better quality generation and reduced computational costs.

To put it another way, DMs have provided a great breakthrough in image synthesis, exhibiting great scalability to complex and large-scale datasets and even achieving promising results in difficult text-to-image generation. Specifically, based on a prompt from a user such as "draw a picture of a cat", the DM may use the prompt to generate an image by iteratively denoising an image of Gaussian noise until an image of a cat is obtained. As a next step, recent works have actively focused on developing DMs to solve the more challenging problem of video generation. However, despite their efforts, generated results still exhibit a gap between real-world videos, unlike the success seen in the image domain. To tackle this issue, several conventional video diffusion approaches have attempted to exploit visual information in large-scale and high-quality image data by extending pre-trained image DMs for video generation. However, these approaches still suffer from severe memory and computation inefficiency, limiting their scalability to generate real-world high-resolution and long videos. For instance, one of the main drawbacks of these approaches is that they directly deal with a video as a discrete sequence of images (i.e., a cubic array), and the input dimension increases proportionally to the frame resolution and video length. Thus, DMs converted to handle such extremely high-dimensional and complex data are extremely large and inefficient to execute.

Therefore, embodiments of the present disclosure describe a system and method to improve text-guided generation of high-resolution videos by training DMs (e.g., a content frame DM and a motion DM) based on decomposing a video into a singular content frame and motion latent representations, and using the trained DMs to generate high-resolution videos during the inference phase. For instance, to address the aforementioned shortcomings described above, a content frame-motion latent diffusion model (CDM) may be and/or include memory and computation efficient latent video DMs that leverage visual knowledge present in pretrained image DMs. For example, the CMD may be a two-stage framework that first compresses videos to a succinct latent space and then learns the video distribution in the latent space. In contrast to conventional latent video DMs, the CMD utilizes a latent space that directly incorporates a pretrained image DM. In the first stage, using an autoencoder, a low-dimensional latent decomposition into a content frame and latent motion representation is learned. Here, the content frame may be designed as a weighted sum of all frames in a video, where the weights are learned to represent the relative importance of each frame. In the second stage, without adding any new parameters, the content frame distribution may be fine-tuned by using a pretrained image DM, which allows the CMD to leverage the rich visual knowledge in pretrained image DMs. In addition, a new lightweight DM may be used to generate motion latent representations that are conditioned on the given content frame. By using the above, the CDM may avoid having to deal directly with video arrays, and thus, the CDM may achieve significantly better memory and computation efficiency when compared to prior video DM approaches that are built on pretrained image DMs.

In an embodiment, a computer-implemented method for using diffusion models to generate a requested video from a user prompt is provided. The method includes inputting a user prompt for a requested video and Gaussian noise into a content frame diffusion model to generate a content frame for the requested video. The method further includes inputting the generated content frame, the user prompt, and the Gaussian noise into a motion diffusion model to generate motion latent representations corresponding to motions of attributes within the generated content frame that are encoded in a latent space. The method also includes generating the requested video based on inputting the generated content frame and the generated motion latent representations into a video decoder.

BRIEF DESCRIPTION OF THE DRAWINGS

The present systems and methods for text-guided generation of high-resolution videos are described in detail below with reference to the attached drawing figures, wherein.

DETAILED DESCRIPTION

Figure 1A:
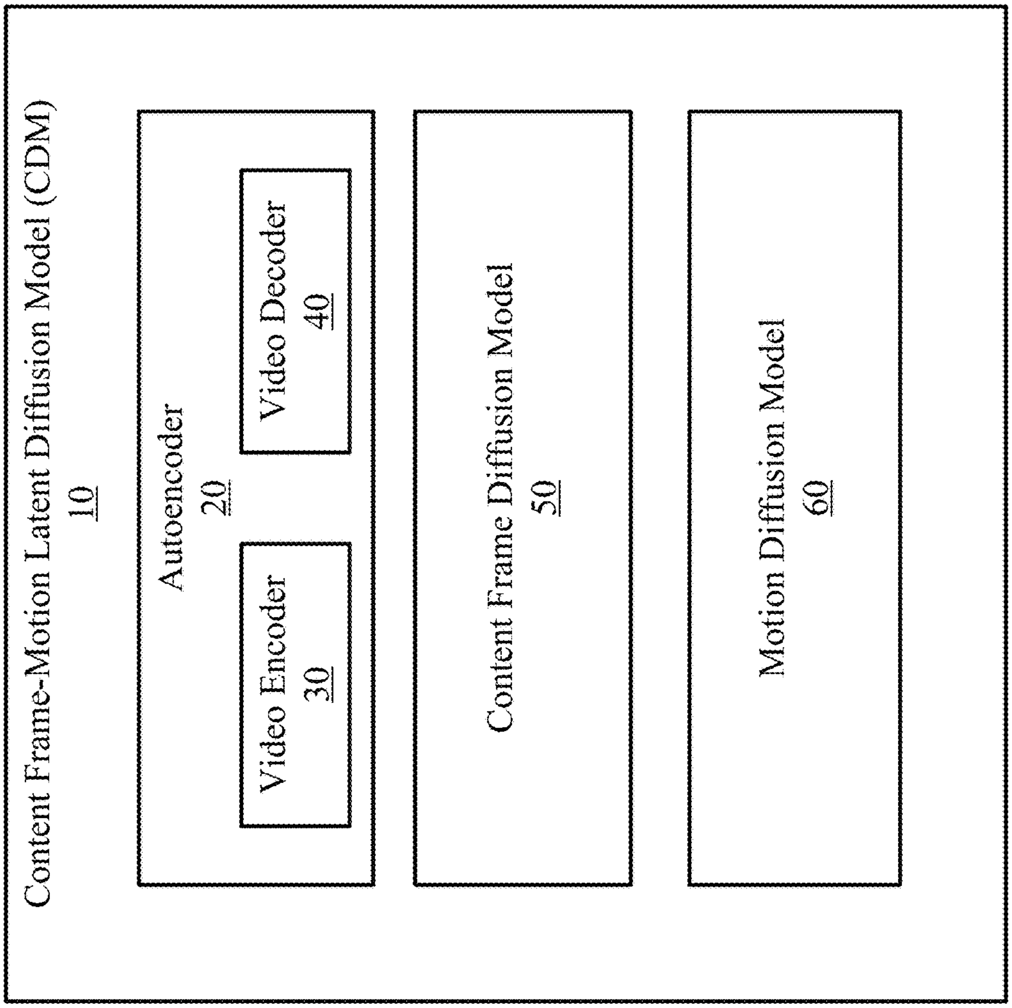
FIG. 1A illustrates a block diagram of a general overview of a content frame-motion latent diffusion model (CDM) that is suitable for use in implementing one or more embodiments of the present disclosure.

Embodiments of the present disclosure describe a content frame-motion latent diffusion model (CDM) for text-guided generation of high-resolution videos. For example, to avoid computing raw video arrays directly (e.g., due to the extremely high dimensionality for high-resolution, long videos that is described above), embodiments of the present disclosure describe a CDM that uses an efficient latent video DM that is built upon a pretrained text-to-image DM. For instance, the CDM may be a two-stage framework (e.g., both in training and inference) that encodes videos as succinct latent vectors, and then learns the video distribution in the latent space. In the first stage, the CDM may include an autoencoder that encodes a video as an “image-like” content frame and low-dimensional motion latent representations. The content frame may be defined as a weighted sum of the frames in the video, where the weights may be learned to represent a relative importance of each frame. Intuitively, the content frame may blend the overall information of the video and may resemble a natural image. Following, motion latent representations may be constructed to succinctly encode motion in a video, and may have the role of unwrapping the information in the content frame for video decoding. In the second stage, the CDM may include a content frame DM and a new lightweight DM (e.g., motion DM) for generating motion latent representations.

As will be described in more detail below, embodiments of the present disclosure describe a CDM that includes an autoencoder and one or more DMs. Given that the CDM avoids dealing with giant cubic video arrays, the CDM achieves much better computation and memory efficiency than conventional techniques. For example, during testing, the CMD was able to sample a video 7.7 times faster than conventional approaches by generating a video of 512×1024 resolution and length 16 (e.g., 16 frames) in 3.1 seconds. Moreover, the CMD achieves a Fréchet Video Distance (FVD) score of 212.7 utilizing the WEBVID-10M dataset, which is a 27.3% improvement over conventional techniques that achieved a FVD score of 292.4. Furthermore, using a single NVIDIA A100 40 GB GPU to generate a single video of a resolution 512×1024 and a length of 16 frames, floating-point operations per second (FLOPS) and memory consumption were measured for the CDM and conventional techniques. Compared to conventional techniques, the CMD uses approximately 18.0 times less computation with only approximately 66% graphics processing unit (GPU) memory usage in sampling, while achieving significantly better video generation quality. More specifically, during testing, the CMD utilized 56 GB of memory and 46.83 TFLOPs (TeraFLOPs), while conventional techniques utilized 8.51 GB memory and 938.9 TFLOPS.

FIG. 1A illustrates a block diagram of a general overview of a content frame-motion latent diffusion model (CDM) 10 that is suitable for use in implementing one or more embodiments of the present disclosure. It should be understood that the CDM 10, and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the CDM 10 (e.g., the training of the CDM 10 and using the CDM 10 to generate videos during the inference phase) is within the scope and spirit of embodiments of the present disclosure.

In an embodiment, the CDM 10 may include an autoencoder 20 and two DMs—the content frame DM 50 and the motion DM 60. The autoencoder 20 may include a video encoder 30 and a video decoder 40. For instance, the CMD 10 may be a framework that first compresses videos into a succinct latent space (e.g., based on using the autoencoder 20) and then learns the video distribution in the latent space (e.g., using the content frame DM 50 and the motion DM 60). Initially, an input video may be decomposed into a low-dimensional latent decomposition that includes a content frame and latent motion representations using an autoencoder 20 comprising a video encoder 30 and a video decoder 40. After training the autoencoder 20, two DMs (e.g., the content frame DM 50 and the motion DM 60) are trained-one for the content frame and another for the motion latent representations. As such, instead of using DMs to deal directly with video arrays (i.e., a cubic array that scales based on the length of the video), the CMD 10 operates in a latent space on a singular content frame and motion latent representations. The motion latent representations represent motions or movement of attributes (e.g., objects, features, and/or areas of interest) within the video frames of the input video that are encoded in a latent space.

To put it another way, a condition-video pair dataset $\mathcal{D}$ may be obtained, where each sample $(c, x^{1:L}) \in \mathcal{D}$ may be drawn from an unknown data distribution $p_{data}(x^{1:L}, c)$. Here, each c denotes a condition (e.g., video class and/or text description) of the corresponding $x^{1:L}$, and each $x^{1:L}$: $=(x^1, \ldots x^L)$ is a video clip of length L>1 with a resolution height (H) and width (W) H×W, i.e., $x^l \in \mathbb{R}^{C \times H \times W}$ with a channel size C. Using $\mathcal{D}$, the aim of the CDM 10 may be to learn a conditional model distribution $p_{model}(x^{1:L}|c)$ to match the data distribution $p_{data}(x^{1:L}|c)$.

In other words, in some embodiments, an objective of the CDM 10 may be to encode each video into an "image-like" content frame and succinct motion latent representation, where pretrained image DMs may be used to generate content frames due to the similarity between natural images and content frames. By doing so, rich visual knowledge learned from image data may be leveraged for video synthesis, leading to better generation quality as well as reduced training costs. Given content frames, the video generation task thus reduces to designing a motion DM to generate much lower-dimensional motion latent representation.

Prior to discussing the CDM 10 in more detail, an overview of DMs is first described. For instance, the main concept of DMs is to learn the target distribution $p_{data}(x)$ via a gradual denoising process from Gaussian distribution $\mathcal{N}(0_x, I_x)$ (e.g., a normal distribution with a mean of $0_x$ and a standard deviation of $I_x$) to the target distribution. For instance, DMs may learn a reverse process of the pre-defined forward process that gradually adds Gaussian noise.

As the sampling process of DMs usually uses a large number of network evaluations (e.g., 1,000 evaluations), their generation cost becomes especially high if one defines DMs in the high-dimensional data space. To mitigate this issue, several conventional techniques have proposed latent DMs such as by training the DM in a low-dimensional latent space that encodes the data, thus reducing the computation and memory cost. Inspired by the success of the conventional techniques, embodiments of the present disclosure follow a similar approach of using latent DMs to improve both training and sampling efficiency for video synthesis.

Figure 1B:
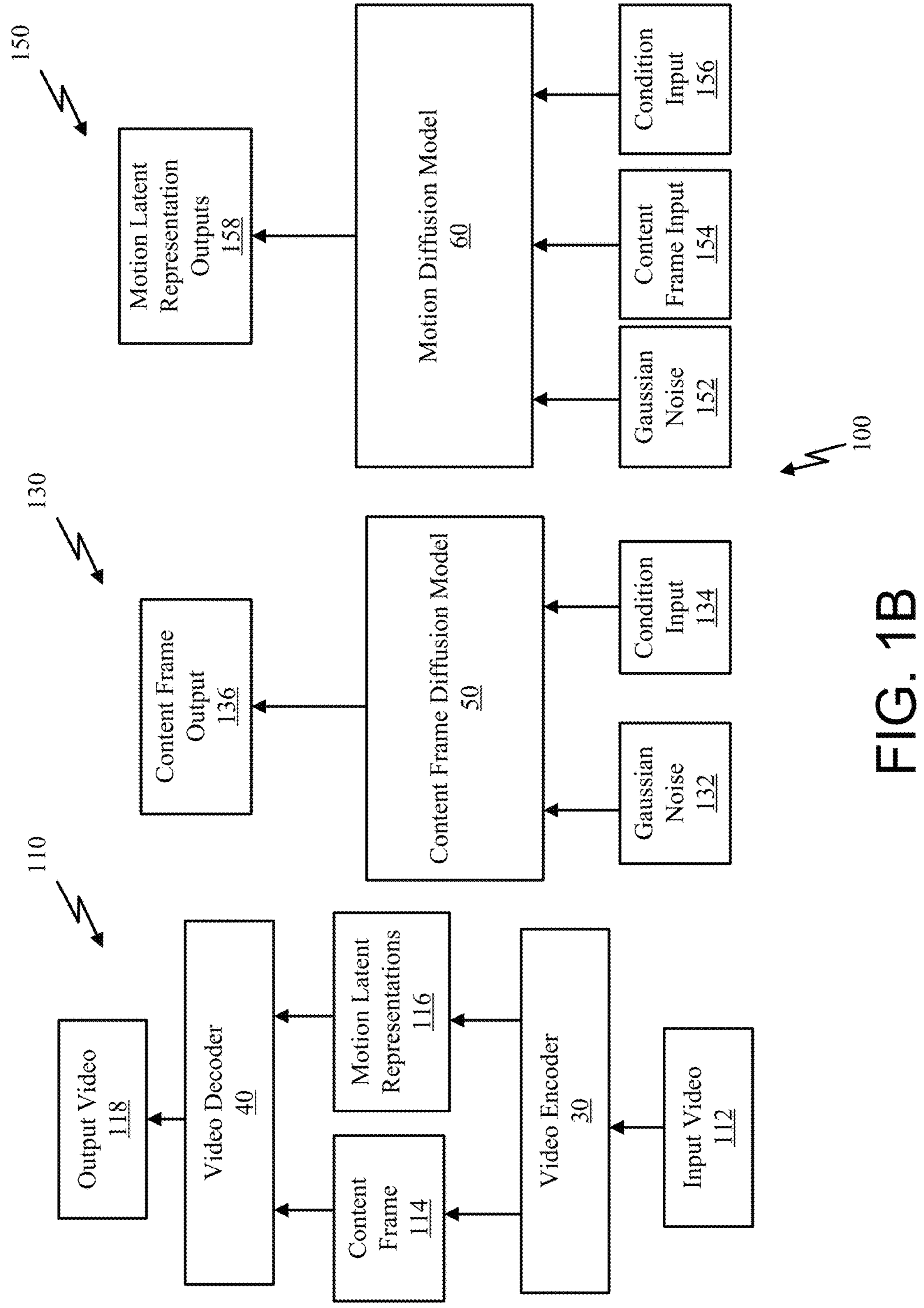
FIG. 1B illustrates a block diagram showing a training phase for a content frame-motion latent diffusion model (CDM), in accordance with one or more embodiments of the present disclosure.

The below describes the training phase of the CDM 10 (e.g., FIGS. 1B, 2A, and 2B) and using the CDM 10 during the inference phase (e.g., FIG. 3A). FIG. 1B illustrates a block diagram showing a training phase 100 for a content frame-motion latent diffusion model (CDM) (e.g., the CDM 10 from FIG. 1A), in accordance with one or more embodiments of the present disclosure. The training phase 100 for the CDM 10 includes three separate phases 110, 130, and 150.

During the training phase 100 for the CDM 10, the CDM 10 may be trained in three separate phases 110, 130, and 150, which may be described as a first stage (e.g., the first phase 110) and a second stage (e.g., the second and third phases 130 and 150). In the first phase 110, aspects of the autoencoder 20 (e.g., the video encoder 30 and the video decoder 40) are trained. Then, during the second phase 130, the content frame diffusion model 50 is trained. Following, during the third phase 150, the motion diffusion model 60 is trained.

In other words, the CMD 10 includes an autoencoder 20 and two latent diffusion models 50 and 60. First, during the first phase 110, the autoencoder 20 is trained that encodes a video $x^{1:L}$ as a single content frame $\bar{x}$ and low-dimensional motion latent representation z. After that, learning the target distribution $p_{data}(x^{1:L}|c)$ may be defined as learning the following distribution: $p(\bar{x},z|c)=p(z|\bar{x},c)p(\bar{x}|c)$. Each distribution (e.g., $p(\bar{z}|x, c)$ and $p(\bar{x}|c)$) may be modeled using two DMs (e.g., DMs 50 and 60), where a pretrained image diffusion model for learning the content frame distribution $p(\bar{x}|c)$ is utilized.

As such, unlike conventional approaches that may directly add temporal layers in pretrained image diffusion models for extension, the CMD 10 may encode each video as an "image-like" content frame and motion latent representations (e.g., content frame 114 and motion latent representations 116), and then may fine-tune a pretrained image diffusion model (e.g., the content frame diffusion model 50) for content frame generation and may train a new lightweight diffusion model (e.g., the motion diffusion model 60) for motion generation.

Each of the three training phases 110, 130, and 150 for the CDM 10 will be described in further detail below. Referring to the first phase 110, input videos 112 are provided to a video encoder 30 to generate a content frame 114 and motion latent representations 116. The content frame 114 and motion latent representations 116 are provided to a video decoder 40 to generate an output video 118. For instance, a training dataset may include a condition-video pair dataset D, where each sample of the dataset includes a video clip and a condition c (e.g., a video class or text description) that describes the video clip. The video clip (e.g., the input video 112) is input into a video encoder 30 to generate the content frame 114 and the motion latent representations 116. The video encoder 30 and the generation of the content frame 114 as well as the motion latent representations 116 is described in further detail in FIG. 2A.

Figure 2A:
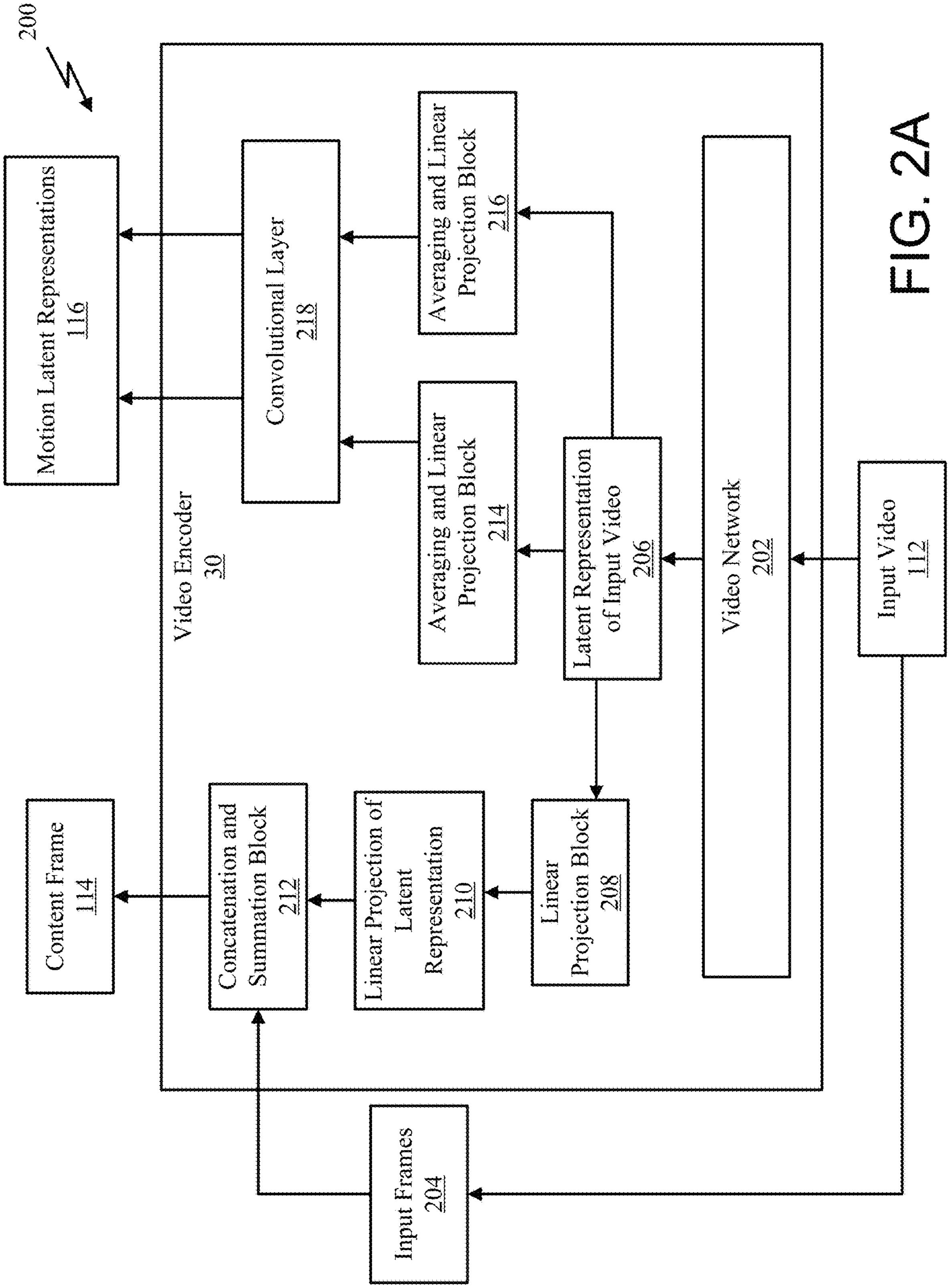
FIG. 2A illustrates a block diagram of an exemplary video encoder of the CDM, in accordance with one or more embodiments of the present disclosure.

FIG. 2A illustrates a block diagram of an exemplary video encoder 30 of the CDM 10, in accordance with one or more embodiments of the present disclosure. For instance, FIG. 2A shows the operation 200 of the video encoder 30. In operation, the input video 112 is provided to a video network 202 to transform the input video 112 into a latent representation 206 of the input video 112. The latent representation 206 may indicate or represent the hidden features u of the input video 112. In some instances, the video network 202 is a video transformer such as a Video Vision Transformer (ViViT), which is described by Arnab et al. in "ViVit: A Video Vision Transformer," in IEEE International Conference on Computer Vision, 2021 and the entire contents of which is incorporated herein by reference.

After obtaining the latent representation 206, the latent representation 206 is used to compute the content frame 114 and the motion latent representations 116. For computing the content frame 114, the linear projection block 208 generates a linear projection of the latent representation 210 based on being provided the latent representation 206. For example, the linear projection block 208 performs a linear projection on the latent representation 206 (e.g., a Softmax function on the latent representation 206) so as to include additional parameters to the latent representation 206 and map the latent representation 206 from one latent space to another latent space. In some variations, the linear projection block 208 may be a multilayer perception (MLP) that performs the linear projection/operation. As such, the linear projection of the latent representation 210 is generated by the linear projection block 208 (e.g., the MLP) and provided to a concatenation and summation block 212.

The concatenation and summation block 212 obtains the linear projection of the latent representation 210 and the input frames 204 of the input video 112. The linear projection of the latent representation 210 comprises the weights indicating the importance of features (e.g., objects) within the frames of the input video 112. Subsequently, for each frame of the input video 112, the block 212 performs an element-wise product of the frame with the weights of the linear projection 210 to obtain a result, which indicates the importance of the features within the frame. Then, the block 212 performs a summation on the results for each of the input frames 204 to indicate the importance of the features across the entire input video 112, and the result of the summation is the content frame 114. The computation of the content frame 114 is described by the below function:

$$\bar{x} := \sum_{l=1}^{L} \left(x^l \otimes \sigma(f_{\phi 1}(u))^l\right)$$

where $\bar{x}$ is the content frame 114, L is the length of the input video 112, $x^l$ is a frame from the input video 112, $\otimes$ is an element-wise product, $\sigma(f^{\phi 1}(u))$ is a softmax function operating on $f_{\phi 1}(u)$, and $f_{\phi 1}(u)$ is the latent representation 206 with hidden features u that is generated by the video network 202.

To generate the motion latent representations 116, the video encoder 30 utilizes averaging and linear projection blocks 214 and 216 and a convolutional layer 218. For example, the latent representation 206 (e.g., hidden features u) may be a data structure having four dimensions (C'×L×H'×W') associated with the four dimensions of the input video 112, channel C, length L, height H, and width W. The motion latent representation z may comprise two separate representations ($z_x$, $z_y$), where $z_x$ is a motion latent representation in the x-axis (height axis) and $z_y$ is a motion latent representation in the y-axis (width axis). Initially, the blocks 214 and 218 perform an averaging operation across the x-axis and γ-axis, and then perform a linear projection (e.g., using MLPs as described above) to generate two projected tensors for the hidden features u. The two projected tensors may be represented as $\bar{u}_x \in \mathbb{R}^{C' \times L \times H'}$ and $\bar{u}_y \in \mathbb{R}^{C' \times L \times W'}$. Then, the two projected tensors are provided to the convolutional layer 218, and the convolutional layer 218 generates the motion latent representation z that comprises $z_x$ and $z_y$. This is described by the following equation:

$$(z_x, z_y) := (f_{\phi M}(\bar{u}_x), f_{\phi M}(\bar{u}_y))$$

where $f_{\phi M}$ is a 1×1 convolutional layer (e.g., the convolutional layer 218).

Returning back to FIG. 1B, after generating the content frame 114 and the motion latent representation 116, the content frame 114 and the motion latent representation 116 are provided to the video decoder 40 to generate the output video 118. The video decoder 110 is described in further detail in FIG. 2B.

Figure 2B:
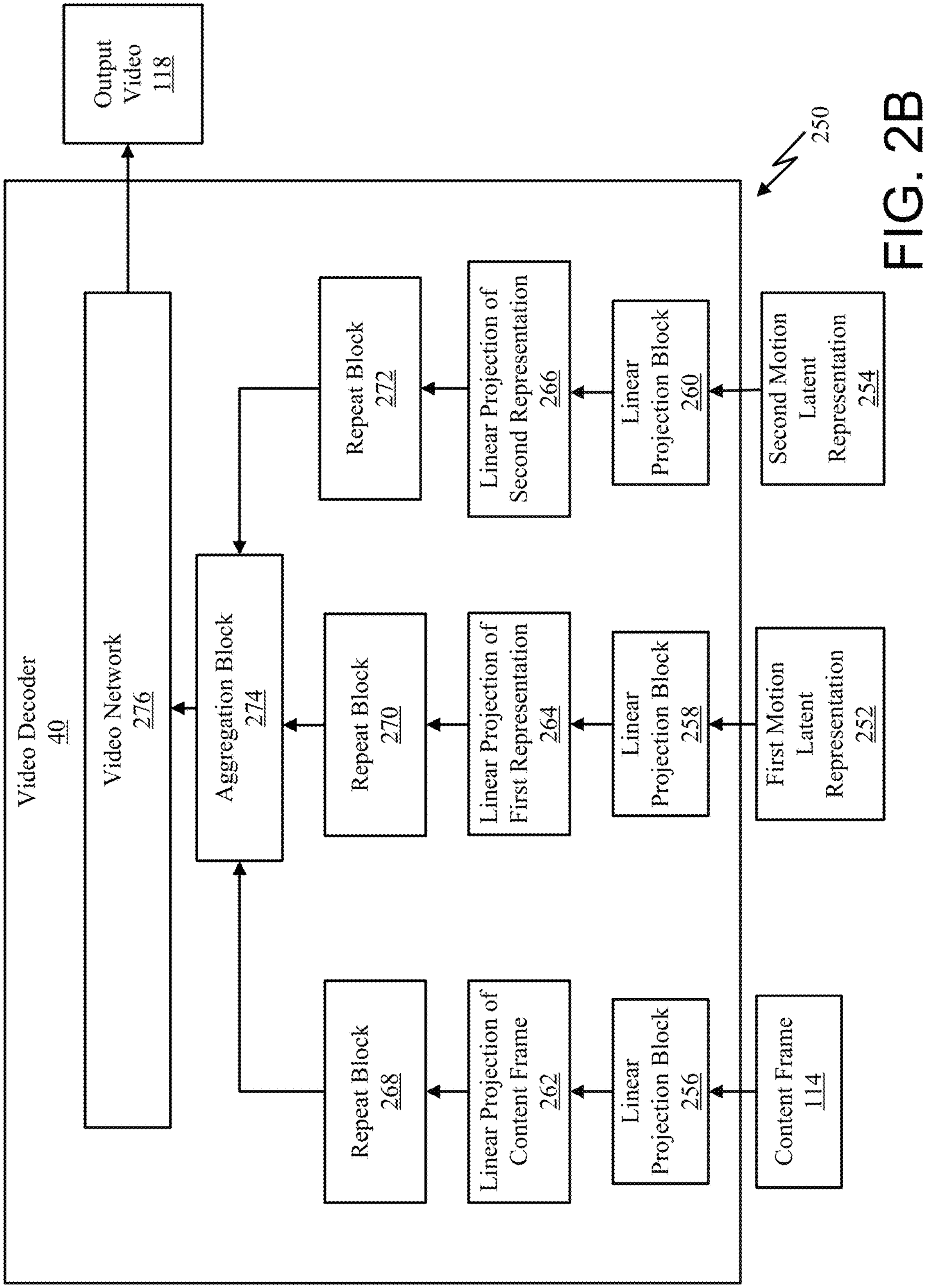
FIG. 2B illustrates a block diagram of an exemplary video decoder of the CDM, in accordance with one or more embodiments of the present disclosure.

FIG. 2B illustrates a block diagram of an exemplary video decoder 40 of the CDM 10, in accordance with one or more embodiments of the present disclosure. For instance, FIG. 2B shows the operation 250 of the video encoder 40. In operation, the content frame 114 and the motion latent representation 116 (e.g., the first and second motion latent representations $z_x$ 252 and $z_y$ 254) are provided to linear projection blocks 256-260 to generate linear projections 262-266. As mentioned above, the linear projection blocks 256-260 may be MLPs that linearly project the inputs (e.g., the content frame 114 as well as the first and second motion latent representations $z_x$ 252 and $z_y$ 254). The repeat blocks 268-272 may be used to generate an additional dimension for each of the linear projections 262-266 such that all three projections have the same dimension to be summed together. For example, the content frame 114 includes the height and width dimensions, the first motion latent representation 252 includes the time dimension and the height dimension, and the second motion latent representation 254 includes the time dimension and the width dimension. To enable aggregation, the repeat blocks 268-272 may be used to transform the linear projections 262-266 back into four dimensions (including time, height and width and embedding length), and then the aggregation block 274 sums the outputs from the repeat blocks 268-272 (e.g., the three tensors from the repeat blocks 268-272) into a single tensor v. The single tensor v is then passed to the video network 276, which may be similar to the video network 202 of the encoder 30, to generate the output video 118.

Returning back to FIG. 1B, during the first phase 110, the autoencoder 20 may be trained using a standard autoencoder loss (e.g., a simple reconstruction objection such as an &2 loss). For instance, the loss may be computed based on comparing the input video 112 and the output video 118 that is output from the video decoder 40. Then, using backpropagation, the weights of the base video encoder 30 and the base video decoder 40 may be updated/trained using the loss, and the newly introduced linear projection blocks 208, 214, 216, 256, 258, and 260 (e.g., the weights of the MLPs) may also be updated.

In other words, the autoencoder 20 may be trained using a simple reconstruction objective (e.g., $l_2$ loss) to encode a video input $x^{1:L}$ (e.g., a video input associated with the input video 112). The encoder 30 may include a base network $f_{\phi_B}$ (e.g., the video network 202) and two heads $f_{\phi_I}$, $f_{\phi_M}$ for computing the content frame $\bar{x}$ 114 and the motion latent representations z 116 (respectively) with a parameterization $\phi := (\phi_B, \phi_I, \phi_M)$. Here, the base network $f_{\phi_B}$: $\mathbb{R}^{C \times L \times H \times W} \to \mathbb{R}^{C' \times L \times H' \times W'}$ (with $f_{\phi_B}(x^{1:L}) = u$) maps a video $x^{1:L}$ (e.g., the input video 112) to hidden feature u with a channel size C'. As mentioned above, the base network $f_{\phi_B}$ (e.g., video network 202) may be a video transformer. Next, the head $f_{\phi_I}$: $\mathbb{R}^{C' \times L \times H' \times W'} \to \mathbb{R}^{C \times L \times H \times W}$ returns relative importance among video frames $x^1, \ldots, x^L$ to compute the content frame $\bar{x}$ 114. The head $f_{\phi_I}$ may include the linear projection block 208 and the concatenation and summation block 212. Specifically, the content frame $\bar{x}$ 114 may be computed using $f_{\phi_I}$ as:

$$\bar{x} := \sum_{\ell=1}^{L} \left(x^{\ell} \otimes \sigma(f_{\phi_I}(u))^{\ell}\right),$$

where $\otimes$ denotes an element-wise product and $\sigma(\bullet)$ is a softmax function across the temporal axis. Consequently, the content frame x 114 may have the same dimension with each frame and may lie in the space of interpolating consecutive frames, thus looking very similar to them.

For motion latent representation z 116, a concatenation of two latents may be used, e.g., $z=(z_x, z_y)$ with $z_x \in \mathbb{R}^{D\times L\times H'}$ and $z_y \in \mathbb{R}^{D\times L\times W'}$, where $z_x$, $z_y$ are computed from u using $f_{\phi_M}$ as follows:

$$(z_x, z_y) := \left(f_{\phi_M}(\bar{u}_x), f_{\phi_M}(\bar{u}_y)\right).$$

Here, $\bar{u}_x \in \mathbb{R}^{C'\times L\times H'}$, $\bar{u}_y \in \mathbb{R}^{C'\times L\times W'}$ are two projected tensors of u by simply averaging across x-axis and y-axis (e.g., using the averaging and linear projection blocks 214 and 216), respectively, and $f_{\phi_M}$ is a 1×1 convolutional layer (e.g., the convolutional layer 218) that maps an input tensor from a channel size C' to D. Such a 2D-projection-based motion encoding may be motivated by recent triplane video encoding that project videos to each x, y, and t axis.

Similarly, a decoder network $g_\psi$ (e.g., the video decoder 40) may include two embedding layers $g_{\psi_I}$, $g_{\psi_M}$ for $\bar{x}$, z (e.g., the content frame 114 and the motion latent representations 116) and a video network $g_{\psi_B}$ (e.g., the video network 276) that returns the reconstruction of $x^{1:L}$ (e.g., the output video 118) from the outputs of $g_{\psi_I}$, $g_{\psi_M}$. For instance, the embedding layers $g_{\psi_I}$ may include the linear projection block 256 and the repeat block 268. The embedding layers $g_{\psi_M}$ may include the linear projection blocks 268 and 260 as well as the repeat blocks 270 and 272. Specifically, $g_{\psi_I}$, $g_{\psi_M}$ map x, z to have the same channel size C':

$$v^t := g_{\psi_I}(\bar{x}) \in \mathbb{R}^{C'\times H'\times W'},\ v^x := g_{\psi_M}(z_x) \in \mathbb{R}^{C'\times L\times H'},\ v^y := g_{\psi_M}(z_y) \in \mathbb{R}^{C'\times L\times W'}$$

where the vectors $v^t$, $v^x$, and $v^y$ are denoted as $$v^t = [v^t_{hw}],\ v^x = [v^x_{\ell h}],\ v^y = [v^y_{\ell w}]$$

with $$v^t_{hw}, v^x_{\ell h}, v^y_{\ell w} \in \mathbb{R}^{C'} \text{ for } \ell \in [1, L], h \in [1, H'], w \in [1, W'].$$

After obtaining the vectors $v^t$, $v^x$, and $v^y$ using the blocks 256-260 and 268-272, the input of a video network $g_{\psi_B}$ (e.g., video network 276) denoted by $v=[v_{\ell hw}] \in \mathbb{R}^{C'\times L\times H'\times W'}$ may be computed using the aggregation block 274. For instance, the aggregation block 274 may take the sum of the corresponding vectors of each $v^t$, $v^x$, $v^y$, namely:

$$v_{\ell hw} = v^t_{hw} + v^x_{\ell h} + v^y_{\ell w} \text{ for } 1 \le \ell \le L,\ 1 \le h \le H',\ 1 \le w \le W',$$

and then v is passed to the video network 276 $g_{\psi_B}$; $\mathbb{R}^{C'\times L\times H'\times W'} \rightarrow \mathbb{R}^{C\times L\times H\times W}$ to generate the output video 118, which is a reconstruction of the input video $x^{1:L}$ 112. In some embodiments, the video network 276 (e.g., $g_{\psi_B}$) may be the same video transformer architecture as the video network 202 (e.g., $f_{\phi_B}$).

After training the autoencoder 20, the second phase 130 is performed to train the content frame diffusion model 50. Initially, the content frame diffusion model 50 may be an already trained (e.g., pre-trained) image diffusion model such as a stable diffusion model. In the second phase 130, the content frame diffusion model 50 may be fine-tuned (e.g., additionally trained) to account for the content frame generation. For instance, given the condition-video pair dataset D that includes the video clip and condition c, the video clip may be provided to the already trained video encoder 30 (e.g., after completing the first phase 110) to generate a content frame 114. Further, the condition input 134 (e.g., the condition c from the same sample) and Gaussian noise 132 may be provided to the content frame diffusion model 50 to generate the content frame output 136. By comparing the generated content frame output 136 with the content frame 114 that is output from the video encoder 30, which was trained during the first phase 110, a standard diffusion loss (e.g., denoising objective) may be computed. The computed loss may be used to train/update/fine-tune the content frame diffusion model 50.

In other words, as mentioned above, the content frame x 114 may be computed as a weighted sum of video frames $x^1, \ldots, x^L$ of the input video 112 and thus the content frame x 114 may resemble natural images. Hence, for training the content frame diffusion model 50 to learn $p(\bar{x}|c)$, a pre-trained image diffusion model $\epsilon_{\theta_I}(x_t, c, t)$ directly fine-tune without adding additional parameters. In particular, condition-content-frame pairs $(c, \bar{x})$ computed from the dataset $\mathcal{D}$ may be used and further, the denoising objective for fine-tuning may be used. The denoising objective for fine-tuning may be represented below:

$$\mathbb{E}_{\bar{x}_0,\epsilon,t}\left[\left\|\epsilon - \epsilon_{\theta_I}(\bar{x}_t, c, t)\right\|_2^2\right] \text{ where } \bar{x}_t = \sqrt{\bar{\alpha}_t}\,\bar{x}_0 + \sqrt{1-\bar{\alpha}_t}\,\epsilon.$$

where $\bar{x}_0$ is the weighted sum of the video frames, $\epsilon$ is the Gaussian noise, c is the text conditioning, t is the diffusion time step, $\bar{\alpha}_t$ is a hyperparameter that controls the noise scale in the diffusion process, and $\bar{x}_t$ is the diffused version of the weighted sum of the video frames.

In some embodiments, the fine-tuning of the pretrained image diffusion model may be memory-efficient since the fine-tuning does not increase input dimension, and the content frame diffusion model 50 may be trained efficiently due to the small gap between content frames and natural images.

In the third phase 150, after the content frame diffusion model 50 and the autoencoder 20 are trained, the motion diffusion model 60 is trained. For instance, taking a sample from the dataset D, the input video 112 is provided to the trained video encoder 30 to obtain the content frame 114 and the motion latent representations 116. Further, the condition input 134 and Gaussian noise 132 are provided to the trained content frame diffusion model 50 to obtain a content frame output 136. The motion diffusion model 60 receives as input Gaussian noise 152, a content frame input 154 (e.g., the content frame output 136 from the content frame diffusion model 50 and/or the content frame 114 that is output from the video encoder 30), and the condition input 156 (e.g., the same condition input as the condition input 134 that is provided to the trained content frame diffusion model 50). Based on the inputs, the motion diffusion model 60 generates motion latent representation outputs 158. By comparing the generated motion latent representation outputs 158 with the motion latent representations 116 that were output from the video encoder 30, a standard diffusion loss (e.g., denoising objective) may be determined. The loss may be used to train/update the motion diffusion model 60. In some examples, the motion diffusion model 60 may be a lightweight DM such as a vision transformer (ViT) (e.g., one or more Diffusion Transformers (DiT), which are described in Peebles et al. "Scalable diffusion models with transformers," in IEEE International Conference on Computer Vision, 2023 and the entire contents of which is incorporated herein by reference).

In other words, to learn the conditional distribution $p(z|\overline{x}, c)$, a lightweight diffusion model $\epsilon_{\theta_M}(z_t, c, \overline{x}, t)$ (e.g., the motion diffusion model 60) is trained. For the network architecture of the motion diffusion model 60, DiT, a recently proposed ViT backbone for DMs may be exploited due to the DiT's better performance and efficiency. Accordingly, for a denoising target $z_t$, the denoising target is passed to the model (e.g., the motion diffusion model 60) as a sequence of patch embeddings. Next, for an input condition c, the same conditioning scheme of the original DiT that passes the input condition through the Adaptive Instance Normalization (AdaIN) layers is followed. For the conditioning content frame $\overline{x}$, rather than passing the conditioning content frame x through the AdaIN layers, the conditioning content frame x is fed as input-level patch embeddings such as $z_t$ to provide "dense conditions" to the model (e.g., the motion diffusion model 60) for predicting motion latent representation. Using the inputs, the motion diffusion model 60 may be trained via the denoising objective:

$$\mathbb{E}_{z_0,\epsilon,t}\left[\left\|\epsilon - \epsilon_{\theta_M}(z_t, c, \overline{x}, t)\right\|_2^2\right] \text{ where } z_t = \sqrt{\overline{\alpha}_t}\, z_0 + \sqrt{1-\overline{\alpha}_t}\,\epsilon.$$

where $\overline{x}$ is the weighted sum of the video frames, $\epsilon$ is the Gaussian noise, c is the text conditioning, t is the diffusion time step, $\overline{\alpha}_t$ is a hyperparameter that controls the noise scale in the diffusion process, $z_0$ is the ground-truth motion variable, and $z_t$ is the diffused version of the motion variable.

During testing, it was observed that the lightweight model (e.g., the motion diffusion model 60) may quickly converge to well-predicting motion latent representation z, which may be due to two factors: (a) the rich information provided by the conditions $(c, \overline{x})$, and (b) the low dimensionality of motion latent representation z. Moreover, in some embodiments, a larger patch size for $\overline{x}$ (condition) than z (prediction target) may be used to reduce the total sequence length of input patches to the DiT network, thus further decreasing the computational cost.

After performing the three training phases 110, 130, and 150, the CDM 10 may be used in the inference phase to generate videos based on user prompts (e.g., text and/or audio prompts). This is described in FIG. 3A.

Figure 3A:
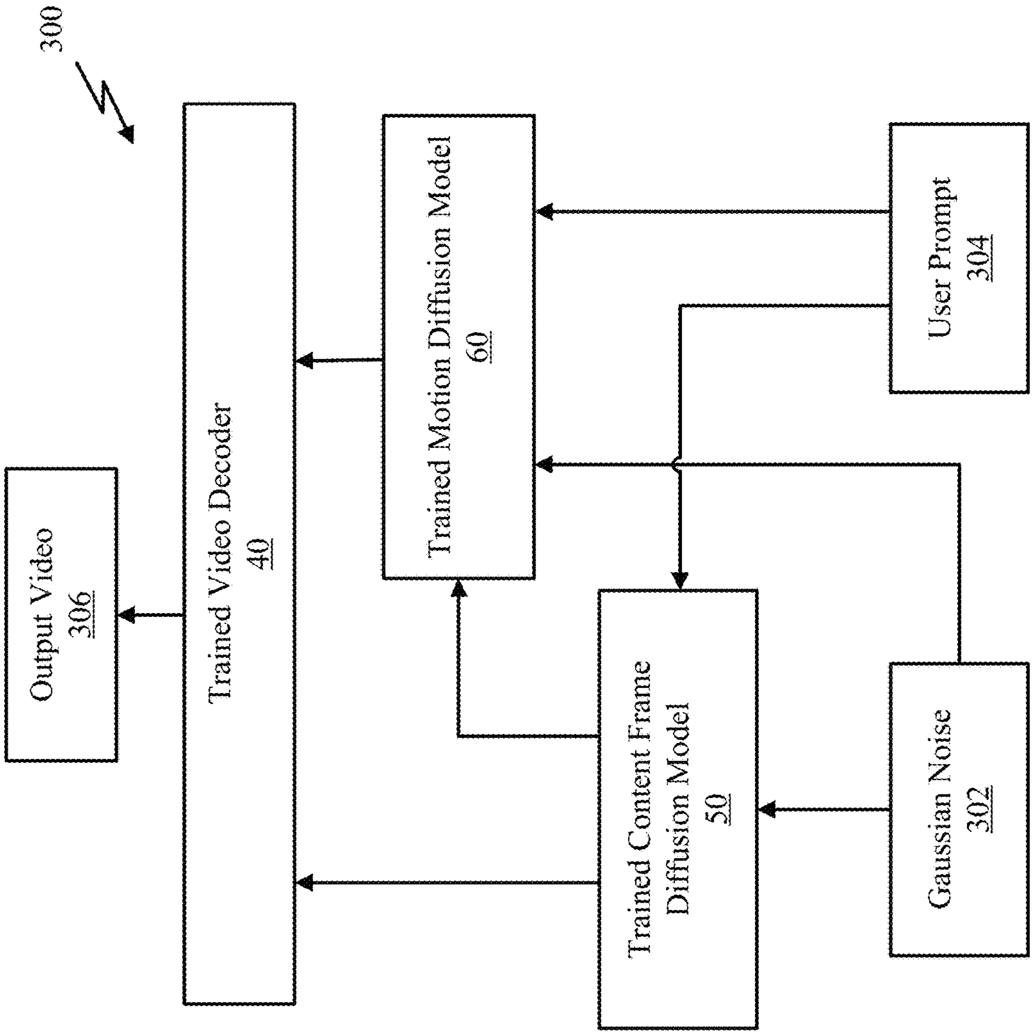
FIG. 3A illustrates a block diagram showing an inference phase that uses the CDM, in accordance with one or more embodiments of the present disclosure.

FIG. 3A illustrates a block diagram showing an inference phase 300 that uses the CDM 10, in accordance with one or more embodiments of the present disclosure. For instance, a computing system may receive a user prompt 304 from a user. Gaussian noise 302 and the user prompt 304 are provided to the trained content frame diffusion model 50 to generate a content frame that is provided to the trained video decoder 40. The content frame may encode and/or indicate weighted sums of all frames in a video, where the weights are learned to represent the relative importance of each frame. For instance, the content frame may blend the overall information of the video and may resemble a natural image. Further, the generated content frame from the trained content frame diffusion model 50, the Gaussian noise 302, and the user prompt 304 are provided to the trained motion diffusion model 60 to generate the latent motion representations. Using the latent motion representations and the content frame, the trained video decoder 40 generates an output video 312 that is provided back to the user.

As such, among other benefits and advantages, embodiments of the present disclosure provide an autoencoder 20 comprising a video encoder 30 that decomposes an input video 112 into a content frame 114 and motion latent representations 116 that are then used to train one or more diffusion models (e.g., the content frame diffusion model 50 and the motion diffusion model 60). Additionally, and/or alternatively, embodiments of the present disclosure may further provide a content frame diffusion model 50 that generates a content frame output 136 based on inputting a condition input 134 and a motion diffusion model 60 that generates motion latent representation outputs 158 based on inputting a condition 156 and content frame input 154. Additionally, and/or alternatively, embodiments of the present disclosure may also provide a video decoder 40 that generates an output video 306 based on a content frame and motion latent representations during the inference phase 300.

Figure 3B:
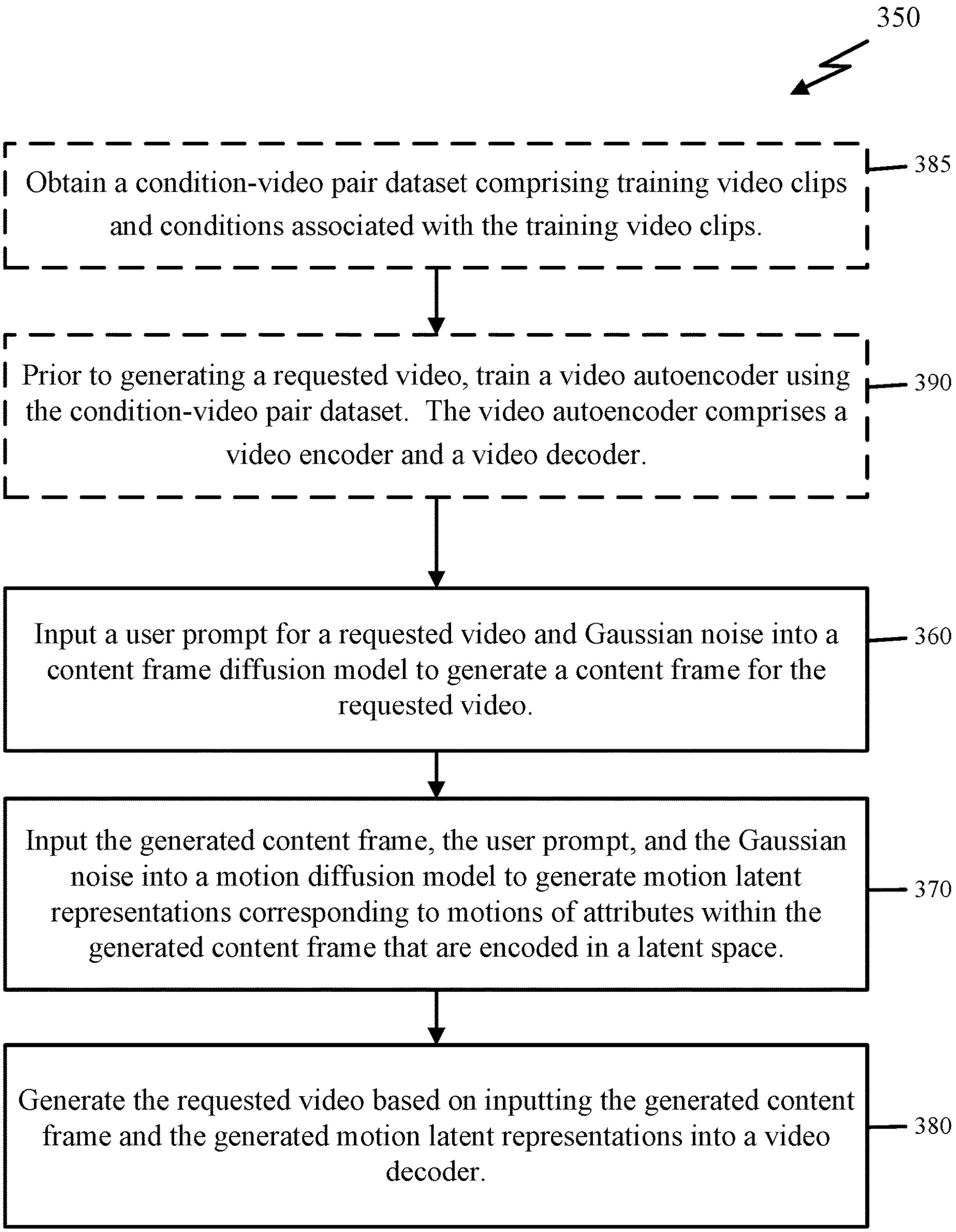
FIG. 3B illustrates a flowchart of a method for using the CDM, in accordance with an embodiment.

FIG. 3B illustrates a flowchart of a method 350 for using the CDM 10, in accordance with an embodiment. Each block of method 350, described herein, comprises a computing process that may be performed using any combination of hardware, firmware, and/or software. For instance, various functions may be carried out by a processor executing instructions stored in memory. The method 350 may also be embodied as computer-usable instructions stored on computer storage media. The method 350 may be provided by a standalone application, a service or hosted service (standalone or in combination with another hosted service), or a plug-in to another product, to name a few. In addition, method 350 is described, by way of example, with respect to the CDM 10 of FIGS. 1A, 1B, 2A, 2B, and 3. However, the method 350 may additionally or alternatively be executed by any one system, or any combination of systems, including, but not limited to, those described herein. Furthermore, persons of ordinary skill in the art will understand that any system that performs method 350 is within the scope and spirit of embodiments of the present disclosure. Steps 385 and 390 are shown using denoted lines to denote that they are optional. Initially, steps 360-380 are first described and then, an embodiment including steps 385 and 390 are described.

At step 360, a user prompt for a requested video and Gaussian noise are input into a content frame diffusion model to generate a content frame for the requested video.

At step 370, the generated content frame, the user prompt, and the Gaussian noise are input into a motion diffusion model to generate motion latent representations corresponding to motions of attributes within the generated content frame that are encoded in a latent space.

At step 380, the requested video is generated based on inputting the generated content frame and the generated motion latent representations into a video decoder.

In other words, in an embodiment, a user prompt for a video may be obtained from the user. The user prompt and noise (e.g., Gaussian noise) may be input into a first diffusion model to generate a frame (e.g., a content frame) indicating objects that are encoded within a latent space. The generated frame, the user prompt, and the noise may be input into a second diffusion model to generate motion representations (e.g., motion latent representations) representing movement of the objects from the frame, and the movement of objects are also encoded within the latent space. The video may be generated using a video decoder to decode the generated frame and the latent representation from the latent space.

In an embodiment, prior to performing steps 360-380, steps 385 and 390 may be performed. For instance, the method 350 may further include, at step 385, obtaining a condition-video pair dataset comprising training video clips and conditions associated with the training video clips. In addition, the method 350 may also include, at step 390, prior to generating the requested video, training a video autoencoder using the condition-video pair dataset. The video autoencoder comprises a video encoder and the video decoder. In an embodiment, training the video autoencoder comprises: inputting a video clip from the condition-video pair dataset into the video encoder to generate a training content frame and a training motion latent representation, inputting the training content frame and the training motion latent representation into the video decoder to generate an output video, computing an autoencoder loss based on comparing the output video and the video clip, and training the video encoder and the video decoder using the autoencoder loss.

In an embodiment, inputting the video clip into the video encoder to generate the training content frame comprises: inputting the video clip into a video network to generate a latent representation of the video clip, performing linear projection on the latent representation of the video clip to generate a linear projection of the latent representation, and concatenating and summing input frames from the video clip and the linear projection of the latent representation to generate the training content frame. In an embodiment, the video network is a Video Vision Transformer and performing the linear projection is based on using a multilayer perceptron (MLP) that performs a Softmax function.

In an embodiment, inputting the video clip into the video encoder to generate the training motion latent representation comprises: inputting the video clip into a video network to generate a latent representation of the video clip, averaging and performing linear projection on the latent representation of the video clip to generate a first projected tensor associated with an x-axis of the video clip and a second projected tensor associated with a y-axis of the video clip, and inputting the first and second projected tensors into a convolutional layer to generate the training motion latent representation comprising a first motion latent representation associated with the x-axis and a second motion latent representation associated with the y-axis.

In an embodiment, inputting the training content frame and the training motion latent representation into the video decoder to generate the output video comprises: performing linear projection on the training content frame and the training motion latent representation to obtain a linear projection of the training content frame and linear projections of the training motion latent representation, transforming and aggregating the linear projection of the training content frame and the linear projections of the training motion latent representation into a single vector, and passing the single vector into a video network to generate the output video.

In an embodiment, the method 350 may further include subsequent to training the video autoencoder, training the content frame diffusion model using the trained video autoencoder and training the motion diffusion model using the trained video autoencoder and the trained content frame diffusion model. In an embodiment, training the content frame diffusion model comprises: inputting a video clip from the condition-video pair dataset into the trained video encoder to generate a training content frame, inputting a condition associated with the video clip from the condition-video pair dataset into the content frame diffusion model to generate an output content frame, computing a diffusion loss based on comparing the training content frame and the output content frame from the content frame diffusion model, and training the content frame diffusion model using the diffusion loss. In an embodiment, the content frame diffusion model is a pre-trained stable diffusion model and training the content frame diffusion model comprises fine-tuning the pre-trained stable diffusion model.

In an embodiment, training the motion diffusion model comprises: inputting a video clip from the condition-video pair dataset into the trained video encoder to generate a training motion latent representation, inputting a condition associated with the video clip into the trained content frame diffusion model to generate a training content frame, inputting the training content frame and the condition into the motion diffusion model to generate an output motion latent representation, and training the motion diffusion model based on comparing the training motion latent representation and the output motion latent representation. In an embodiment, the motion diffusion model is a Diffusion Transformer (DiT).

In an embodiment, at least one of steps 360-380 and/or the further steps described above for method 350 are performed on a server or in a data center to train the CDM 10 and/or to generate the requested video, and the requested video are streamed to a user device. In an embodiment, at least one of steps 360-380 and/or the further steps described above for method 350 is performed within a cloud computing environment. In an embodiment, at least one of steps 360-380 and/or the further steps described above for method 350 is performed for training, testing, or certifying a neural network employed in a machine, robot, or autonomous vehicle. In an embodiment, at least one of steps 360-380 and/or the further steps described above for method 350 is performed on a virtual machine comprising a portion of a graphics processing unit.

In some examples, embodiments of the present disclosure describe a CDM 10 that includes an autoencoder 20 and two diffusion models—a content frame diffusion model 50 and a motion diffusion model 60. For example, the CMD 10 may be a two-stage framework that first compresses videos to a succinct latent space and then learns the video distribution in the latent space. In contrast to conventional latent video DMs, the CMD 10 utilizes a latent space that directly incorporates a pretrained image DM (e.g., the content frame diffusion model 50). In the first stage, using an autoencoder 20, a low-dimensional latent decomposition into a content frame and latent motion representation is learned. Here, the content frame may be designed as a weighted sum of all frames in a video, where the weights are learned to represent the relative importance of each frame. In the second stage, without adding any new parameters, the content frame distribution may be fine-tuned by using a pretrained image DM (e.g., the content frame diffusion model 50), which allows the CMD 10 to leverage the rich visual knowledge in pretrained image DMs. In addition, a new lightweight DM (e.g., the motion diffusion model 60) may be used to generate motion latent representations that are conditioned on the given content frame. By using the above, the CDM 10 may avoid having to deal directly with video arrays, and thus, the CDM 10 may achieve significantly better memory and computation efficiency when compared to prior video DM approaches that are built on pretrained image DMs.

Parallel Processing Architecture

Figure 4:
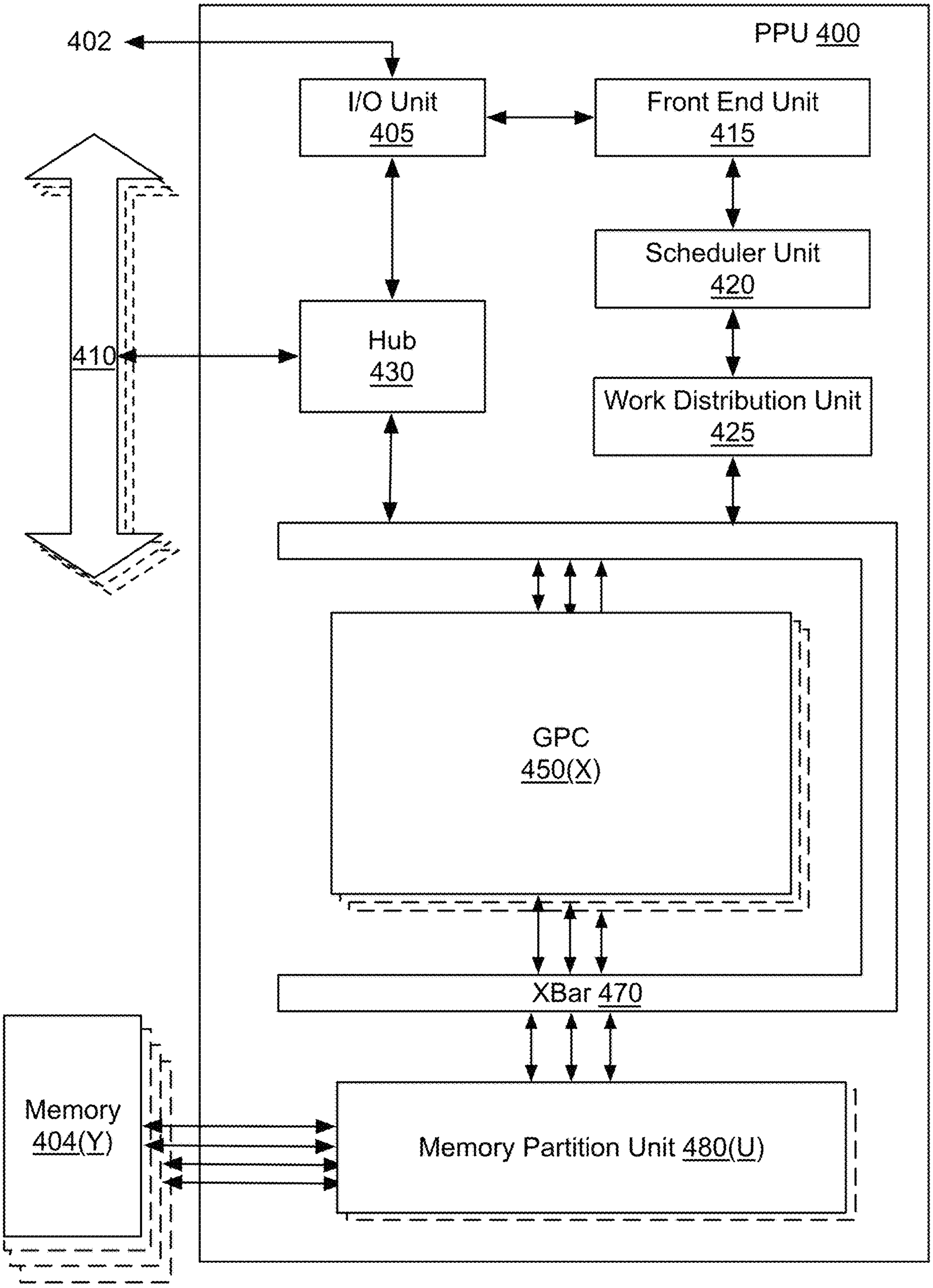
FIG. 4 illustrates an example parallel processing unit suitable for use in implementing some embodiments of the present disclosure.

FIG. 4 illustrates a parallel processing unit (PPU) 400, in accordance with an embodiment. In an embodiment, a processor such as the PPU 400 may be configured to implement a CDM 10 comprising an autoencoder 20 (e.g., a video encoder 30 and a video decoder 40) and two diffusion models (e.g., a content frame diffusion model 50 and a motion diffusion model 60). The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
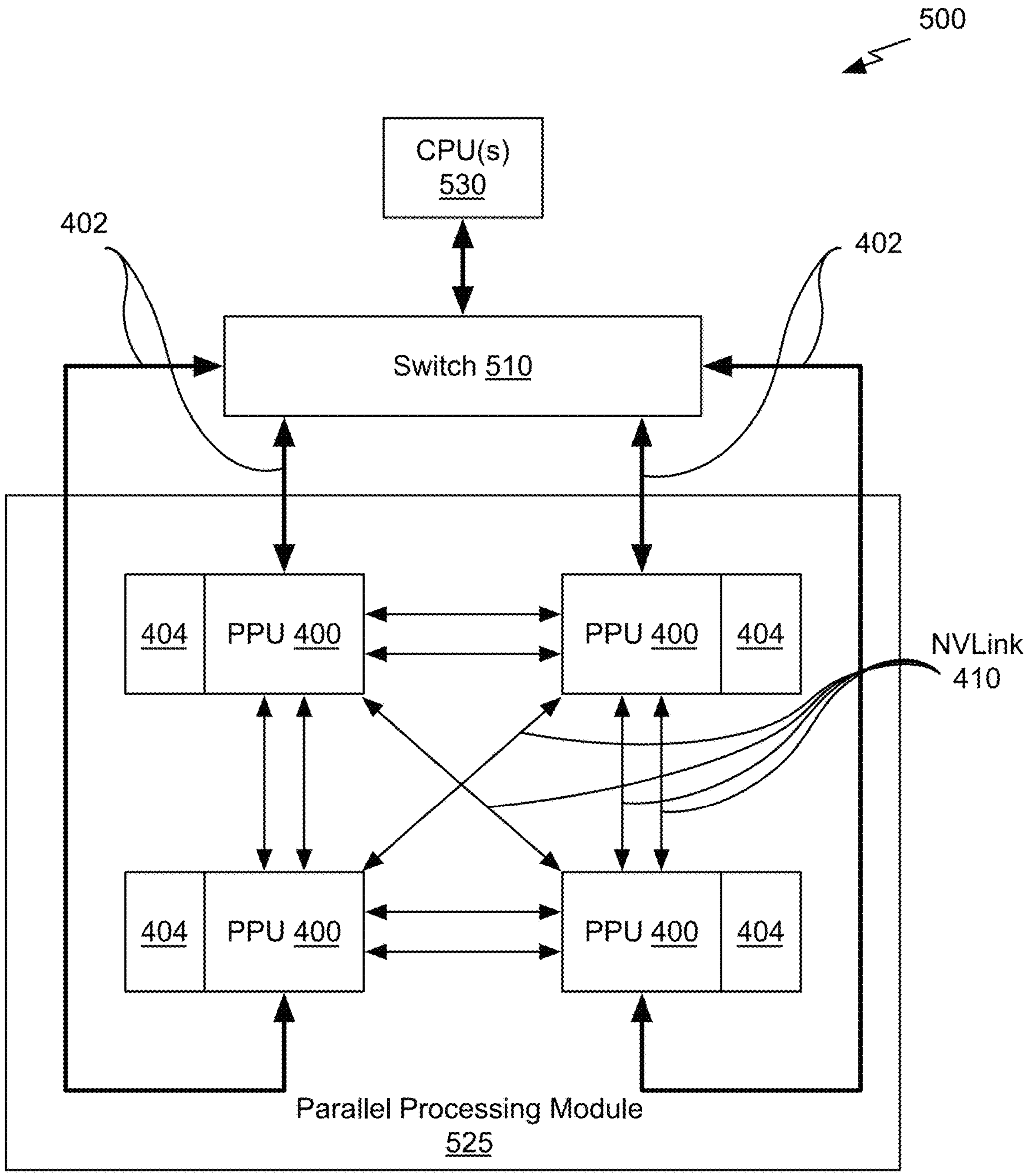
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the sparse voxel transformer for camera-based 3D semantic scene completion. The processing system 500 includes a CPU 530, switch 510, and multiple PPUs 400, and respective memories 404.

Figure 5B:
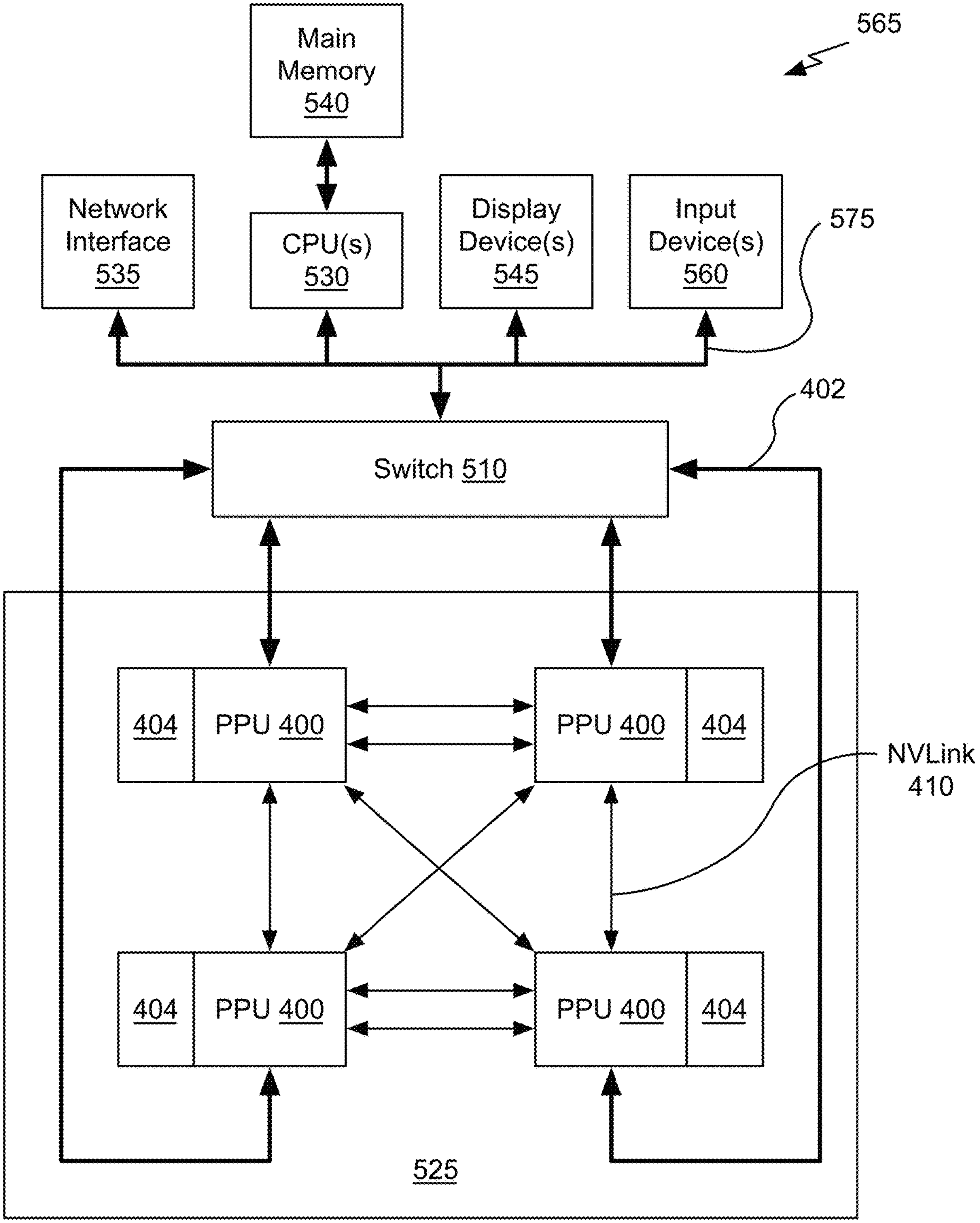
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400

Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the sparse voxel transformer for camera-based 3D semantic scene completion.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment- and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
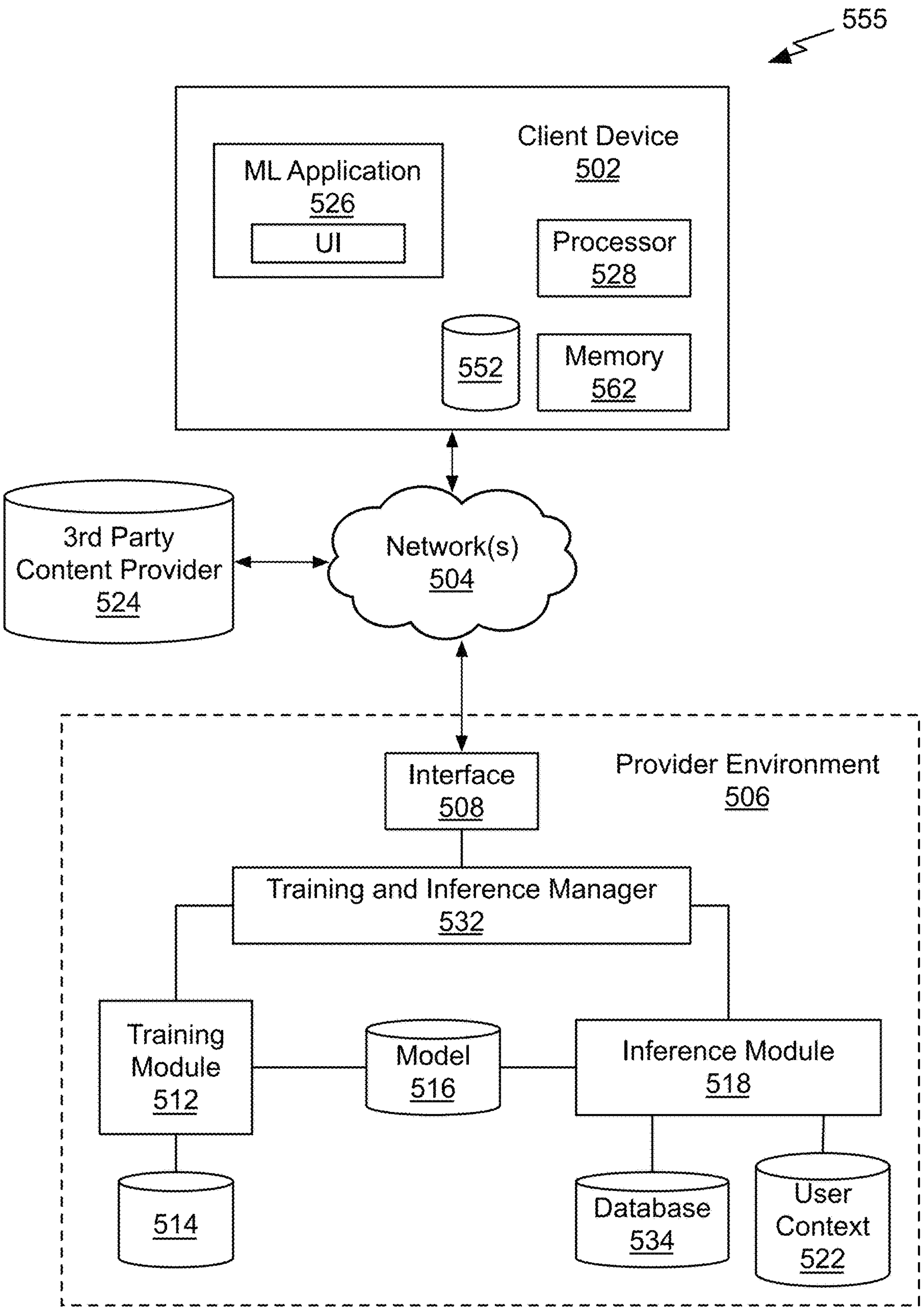
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

A graphics processing pipeline may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline utilizing the hardware of the PPU 400.

Various programs may be executed within the PPU 400 in order to implement the various stages of the graphics processing pipeline. For example, the device driver may launch a kernel on the PPU 400 to perform a vertex shading stage on one processing unit (or multiple processing units). The device driver (or the initial kernel executed by the PPU 400) may also launch other kernels on the PPU 400 to perform other stages of the graphics processing pipeline, such as a geometry shading stage and a fragment shading stage. In addition, some of the stages of the graphics processing pipeline may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA Geforce Now (GFN), Google Stadia, and the like.

Example Streaming System

Figure 6:
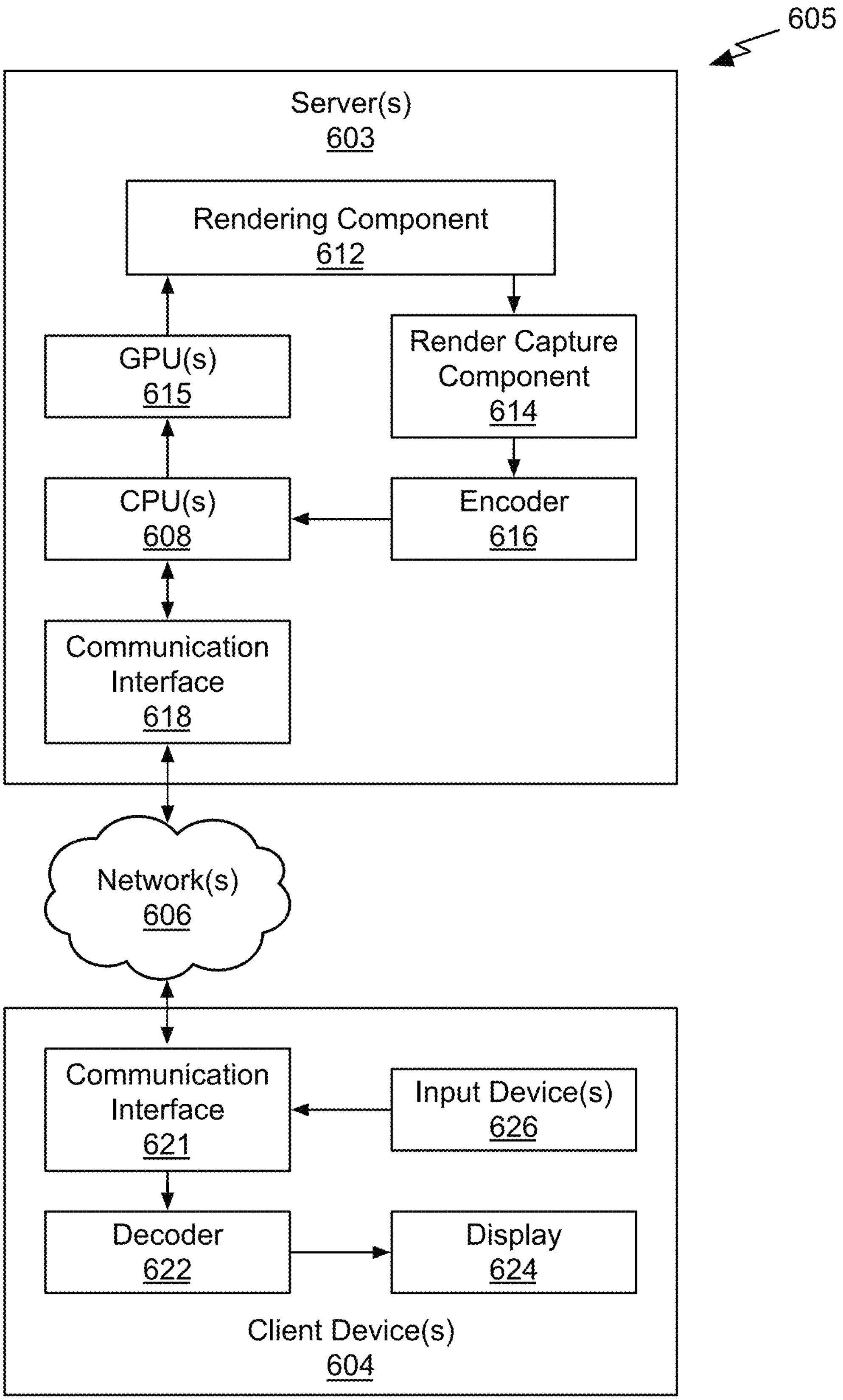
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for using diffusion models to generate a requested video from a user prompt, comprising:

inputting the user prompt for the requested video and Gaussian noise into a content frame diffusion model to generate a content frame for the requested video;

inputting the generated content frame, the user prompt, and the Gaussian noise into a motion diffusion model to generate motion latent representations corresponding to motions of attributes within the generated content frame that are encoded in a latent space; and generating the requested video based on inputting the generated content frame and the generated motion latent representations into a video decoder.

2. The computer-implemented method of claim 1, further comprising:

obtaining a condition-video pair dataset comprising training video clips and conditions associated with the training video clips; and prior to generating the requested video, training a video autoencoder using the condition-video pair dataset, wherein the video autoencoder comprises a video encoder and the video decoder.

3. The computer-implemented method of claim 2, wherein training the video autoencoder comprises:

inputting a video clip from the condition-video pair dataset into the video encoder to generate a training content frame and a training motion latent representation;

inputting the training content frame and the training motion latent representation into the video decoder to generate an output video;

computing an autoencoder loss based on comparing the output video and the video clip; and training the video encoder and the video decoder using the autoencoder loss.

4. The computer-implemented method of claim 3, wherein inputting the video clip into the video encoder to generate the training content frame comprises:

inputting the video clip into a video network to generate a latent representation of the video clip;

performing linear projection on the latent representation of the video clip to generate a linear projection of the latent representation; and concatenating and summing input frames from the video clip and the linear projection of the latent representation to generate the training content frame.

5. The computer-implemented method of claim 4, wherein the video network is a Video Vision Transformer and wherein performing the linear projection is based on using a multilayer perceptron (MLP) that performs a Softmax function.

6. The computer-implemented method of claim 3, wherein inputting the video clip into the video encoder to generate the training motion latent representation comprises:

inputting the video clip into a video network to generate a latent representation of the video clip;

averaging and performing linear projection on the latent representation of the video clip to generate a first projected tensor associated with an x-axis of the video clip and a second projected tensor associated with a y-axis of the video clip; and inputting the first and second projected tensors into a convolutional layer to generate the training motion latent representation comprising a first motion latent representation associated with the x-axis and a second motion latent representation associated with the y-axis.

7. The computer-implemented method of claim 3, wherein inputting the training content frame and the training motion latent representation into the video decoder to generate the output video comprises:

performing linear projection on the training content frame and the training motion latent representation to obtain a linear projection of the training content frame and linear projections of the training motion latent representation;

transforming and aggregating the linear projection of the training content frame and the linear projections of the training motion latent representation into a single vector; and passing the single vector into a video network to generate the output video.

8. The computer-implemented method of claim 2, further comprising:

subsequent to training the video autoencoder, training the content frame diffusion model using the trained video autoencoder; and training the motion diffusion model using the trained video autoencoder and the trained content frame diffusion model.

9. The computer-implemented method of claim 8, wherein training the content frame diffusion model comprises:

inputting a video clip from the condition-video pair dataset into the trained video encoder to generate a training content frame;

inputting a condition associated with the video clip from the condition-video pair dataset into the content frame diffusion model to generate an output content frame;

computing a diffusion loss based on comparing the training content frame and the output content frame from the content frame diffusion model; and training the content frame diffusion model using the diffusion loss.

10. The computer-implemented method of claim 9, wherein the content frame diffusion model is a pre-trained stable diffusion model and wherein training the content frame diffusion model comprises fine-tuning the pre-trained stable diffusion model.

11. The computer-implemented method of claim 8, wherein training the motion diffusion model comprises:

inputting a video clip from the condition-video pair dataset into the trained video encoder to generate a training motion latent representation;

inputting a condition associated with the video clip into the trained content frame diffusion model to generate a training content frame;

inputting the training content frame and the condition into the motion diffusion model to generate an output motion latent representation; and training the motion diffusion model based on comparing the training motion latent representation and the output motion latent representation.

12. The computer-implemented method of claim 11, wherein the motion diffusion model is a Diffusion Transformer (DiT).

13. The computer-implemented method of claim 1, wherein at least one of the steps of inputting and generating are performed on a server or in a data center to generate the requested video, and the requested video is streamed to a user device.

14. The computer-implemented method of claim 1, wherein at least one of the steps of inputting and generating are performed within a cloud computing environment.

15. The computer-implemented method of claim 1, wherein at least one of the steps of inputting and generating are performed for training, testing, or certifying a neural network employed in a machine, robot, or autonomous vehicle.

16. The computer-implemented method of claim 1, wherein at least one of the steps of inputting and generating is performed on a virtual machine comprising a portion of a graphics processing unit.

17. A system for using diffusion models to generate a requested video from a user prompt, comprising:

one or more processors; and a non-transitory computer-readable medium having processor-executable instructions stored thereon, wherein the processor-executable instructions, when executed by the one or more processors, facilitate:

inputting the user prompt for the requested video and Gaussian noise into a content frame diffusion model to generate a content frame for the requested video;

inputting the generated content frame, the user prompt, and the Gaussian noise into a motion diffusion model to generate motion latent representations corresponding to motions of attributes within the generated content frame that are encoded in a latent space; and generating the requested video based on inputting the generated content frame and the generated motion latent representations into a video decoder.

18. The system of claim 17, wherein the processor-executable instructions, when executed by the one or more processors, further facilitate:

obtaining a condition-video pair dataset comprising training video clips and conditions associated with the training video clips; and prior to generating the requested video, training a video autoencoder using the condition-video pair dataset, wherein the video autoencoder comprises a video encoder and the video decoder.

19. The system of claim 18, wherein training the video autoencoder comprises:

inputting a video clip from the condition-video pair dataset into the video encoder to generate a training content frame and a training motion latent representation;

inputting the training content frame and the training motion latent representation into the video decoder to generate an output video;

computing an autoencoder loss based on comparing the output video and the video clip; and training the video encoder and the video decoder using the autoencoder loss.

20. A non-transitory computer-readable medium having processor-executable instructions stored thereon, wherein the processor-executable instructions, when executed, facilitate:

inputting a user prompt for a requested video and Gaussian noise into a content frame diffusion model to generate a content frame for the requested video;

inputting the generated content frame, the user prompt, and the Gaussian noise into a motion diffusion model to generate motion latent representations corresponding to motions of attributes within the generated content frame that are encoded in a latent space; and generating the requested video based on inputting the generated content frame and the generated motion latent representations into a video decoder.

21. The non-transitory computer-readable medium of claim 20, wherein the processor-executable instructions, when executed, further facilitate:

obtaining a condition-video pair dataset comprising training video clips and conditions associated with the training video clips; and prior to generating the requested video, training a video autoencoder using the condition-video pair dataset, wherein the video autoencoder comprises a video encoder and the video decoder.

22. A computer-implemented method for generating a video, comprising:

obtaining, from a user, a user prompt for the video;

inputting the user prompt and noise into a first diffusion model to generate a frame depicting objects that are encoded within a latent space;

inputting the generated frame, the user prompt, and the noise into a second diffusion model to generate motion representations that represent movement of the objects from the frame, wherein the movement of the objects are also encoded within the latent space; and generating the video by using a video decoder to decode the generated frame and the motion representations from the latent space.

* * * * *